Sept. 4, 1962 W. I. WORKMAN 3,052,476
SEAL
Filed May 20, 1960

United States Patent Office
3,052,476
Patented Sept. 4, 1962

3,052,476
SEAL
Woodrow I. Workman, Hill, N.H., assignor to International Packings Corporation, Bristol, N.H., a corporation of Massachusetts
Filed May 20, 1960, Ser. No. 30,540
10 Claims. (Cl. 277—174)

This invention relates to fluid seals and more particularly to a flexible sealing means and cooperating groove especially adapted for use with relatively movable parts, such as a piston seal, to prevent transmission of pressurized fluids.

In most applications a piston in its cylinder will be subjected to an axial fluid pressure either in one or both directions when it is desired that fluid should not pass therebetween or that pressure on one side should not be lost by flow of such fluid. A simple and common application of this which may be used as an illustration is found in a conventional piston arrangement. Other applications may be found in various kinds of shaft seals. With such structures, sealing rings have long been placed in annular grooves either around the piston or shaft itself or in the bearing surface of its casing. In general, such seals have relied on the resiliency of the material of the seal to provide sufficient sealing forces. However, this frequently results in the establishment of considerable friction between the moving elements especially when high sealing forces are required as in applications requiring the sealing of high pressures.

Accordingly, it is an object of the present invention to provide an improved seal for preventing flow of pressurized fluids, especially between opposing surfaces of relatively moving parts, such as a piston and cylinder.

It is a particular feature of the invention to provide such a seal that offers a minimum of resistance to relative axial movement between the moving parts even when high pressures must be sealed.

In accordance with the principles of the present invention, the novel seal provided thereby does not rely primarily on its resilience to supply the requisite sealing forces, but rather utilizes the force of the pressurized fluid itself therefor. This unique operation results in a highly effective fluid seal and yet one in which the resistance to sliding of the relatively moving parts is no higher than is necessary to provide the requisite seal as determined by the pressure of the fluid to be sealed. Too, it is capable of passing over openings such as cylinder wall ports without damage.

More specifically, the unique operation of the seal of the invention results from the use in a first bearing surface of an annular groove of rectangular cross-section and a cooperatnig sealing ring of rubber or like resilient material of generally rectangular cross-section narrower than the width of the groove for transverse sliding movement therein to provide space between one side of the resilient ring and the adjacent side of the groove when the other side of the ring is in sealing contact with the other side of the groove. With such a structure, a pressurized fluid applied at one side of the groove and its contained sealing ring will operate to urge the ring sideways into sealing contact with the other side of the groove as well as to urge the ring away from the bottom of the groove to establish pressurized sealing both at the side of the groove and at the upper face of the sealing ring against the second, cooperating bearing surface. Such upper face is preferably rounded for sliding contact with the cooperating bearing surface and its contact surface is relatively narrow. Preferably, too, the bottom face of the sealing ring adjacent the bottom of the groove has an inwardly arched recessed configuration providing thin, flexible sealing lips at each side of the ring for sealing against the cooperating side of the groove, the region within the arched recess of the seal being pressurized to flex the sealing lip of the ring into intimate contact with the cooperating side of the groove. If desired, two of such rings may usefully be employed in spaced grooves for even more efficient sealing action. The seals of the invention may, of course, be used for sealing between stationary as well as relatively moving surfaces.

Still further objects and features of the present invention will be apparent from the following detailed descriptions of preferred embodiments thereof, together with the appended drawings, in which.

Figure 1:
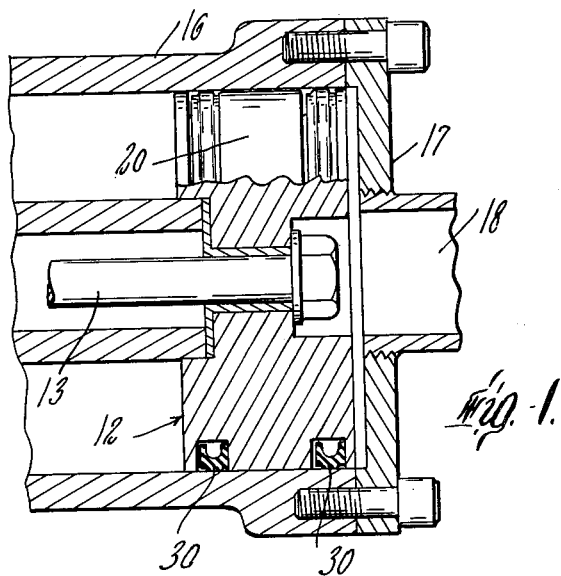
FIG. 1 is a cross-sectional side view of a piston and cylinder structure employing the sealing means of the invention.

In FIG. 1 is shown in cross-section a piston element 12 having the usual piston rod 13. Such piston 12 is mounted for axial sliding movement in a cylinder 16 or other housing having an end closure 17 provided with an outlet 18. The surrounding cylinder 16 provides the cooperating other bearing surface and is of a somewhat larger diameter than the piston bearing surface 20 to provide a clearance therebetween.

Figure 4:
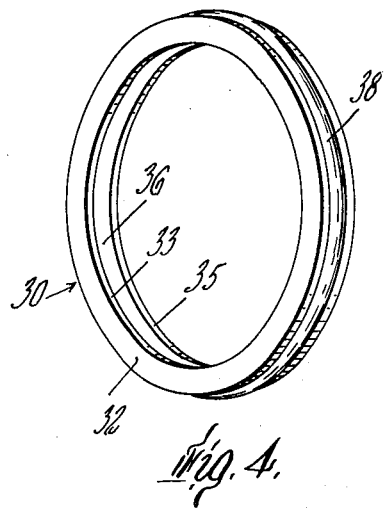
FIG. 4 is an isometric view of a seal of the invention for use in a groove on a cylindrical bearing surface as is shown in FIGS. 1, 2, 3.

According to the present invention, the piston 12 has an outer cylindrical bearing surface 20 of substantial axial extent and is provided with a pair of spaced grooves therein of rectangular cross-section with straight cylindrical bottom surfaces 22 and straight radial side surfaces 24 and 26. Within such grooves are positioned flexible sealing elements designated 30 as shown in isometric view in FIG. 4. Such sealing elements are resilient and flexible, being preferably of rubber or other rubberlike synthetic material. More specifically, the seals are of generally square cross-section and have radially extending flat side surfaces 32 and 34 with the bottom of said seal having an inwardly arched recessed configuration 36 providing relatively thin flexible sealing lips 33 and 35 at sides 32 and 34 respectively, and the diameter of said lips is preferably somewhat greater than that of bottom surface 22 of said groove so that the ring is normally spaced above the bottom of the groove. The upper face of said ring opposite the bottom face has a raised rounded surface 38 narrow relatively to the base of the seal and free of sharp edges for contacting the inner surface of cylinder 16 for sliding movement therealong. It is also usable even when ports are present in the cylinder wall, since the rounded surface 38 will slide freely thereover as the pressure will be automatically released at that point in most cases.

Figure 2:
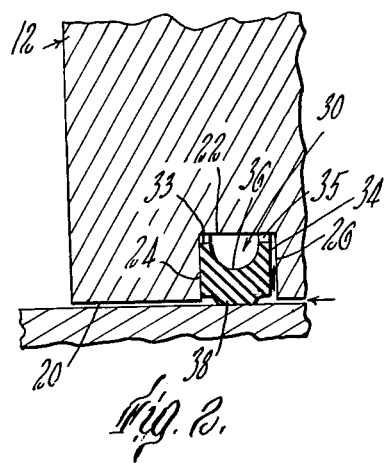
FIG. 2 is an enlarged cross-sectional view showing a portion of the structure of FIG. 1.

As may be seen particularly from FIG. 2, the width of the sealing ring 30 between its straight parallel sides 32 and 34 is somewhat less than the width of the groove between its parallel sides 24 and 26, so that said ring is free to move transversely in said groove. This enables one side thereof to be in contact with one side of said groove throughout its entire depth, i.e., radial extent, with the other side substantially spaced from the side of the groove for free flow of pressurized fluid therearound into volume provided by the recessed portion 36 therebehind, as is shown by the small arrows in FIG. 2. The ring is thus able transversely to shift in its groove in response to the higher fluid pressure applied to one side thereof, and as frequently as is necessary to seal, for example, with an operating piston and cylinder wherein the side of pressure varies on the piston forward and return strokes.

Figure 3:
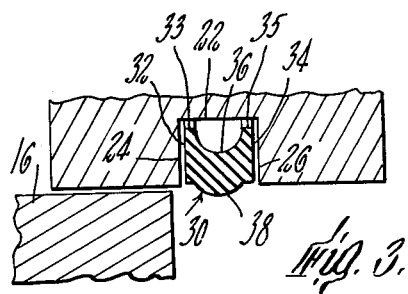
FIG. 3 is an enlarged, partially disassembled cross-sectional view of a portion of the structure of FIG. 1.

It will also be seen, particularly from FIG. 3 that the outer periphery of the seal 30 at raised rounded surface 38 thereof extends outwardly beyond the surface 20 of cylinder 12 by a distance at least as great as, and preferably somewhat greater than the clearance between the outer surface of said cylinder and the cooperating bearing surface of cylinder 16. This is desirable so that sealing will normally take place even if there be no fluid pressure.

In operation, with a fluid seal 30 disposed within the groove, it will be seen, especially in FIG. 2, that a pressurized fluid applied to one side thereof (the right side as is indicated by the small arrows in FIG. 2) will cause the seal to be moved sidewise in its groove (to the left in FIG. 2) so that its side surface 32 will be firmly pressed into sealing contact with the cooperating side 24 of the groove. Thus, the seal will operate in either direction, depending upon the side of higher pressure, and will readily shift transversely in its groove for most effective sealing regardless of the side thereof on which the higher pressure is applied.

At the same time, the pressurized fluid in the arched volume behind the seal will press against the seal and so urge it outwardly with its relatively narrow rounded surface 38 in sealing contact with the inner surface of the cylinder 16. In so doing, because of the relatively narrow surface portion in sealing contact with the inner surface of cylinder 16 as urged by the relatively wide bottom surface of the seal extending for the full width thereof, a differential piston effect exists so that actual sealing pressurse against cylinder 16 are several times higher than the pressure of the pressurized fluid acting against the bottom of the cylinder. This produces a highly effective seal, yet one relatively low in sliding resistance.

For best operation, two such seals are employed for a multiple sealing effect with two pressure drops. Nevertheless, each seal will be shifted back and forth in its groove as the pressure on one side of the piston varies with respect to the pressure on the other side of the piston. This is shown by the position of the seals in FIG. 1 wherein the higher pressure is at the left side so that the seals in their spaced grooves are in sealing contact with the right sides of their respective grooves adjacent one another.

It will be seen, then, that the present invention has—by reasons of the unique ability of its resilient, flexible sealing element to move within its cooperating groove—as well as its differential piston effect providing high sealing pressures—provided as superior seal for preventing flow particularly of pressurized fluids. At the same time it presents a minimum of frictional resistance to relatively moving parts and is able to traverse cylinder wall ports. Various modifications of the invention not herein shown, yet within the spirit thereof and the scope of the appended claims will be apparent to those skilled in this art.

I claim:

1. Sealing means for a pressurized fluid comprising a first element and a second element, one of said elements having an annular groove of rectangular cross section of predetermined width and depth and the other of said elements having a bearing surface extending across said groove, and an endless annular sealing ring of rubber or like resilient material of generally square cross section having upper and bottom faces with said bottom face having a configuration providing a pair of thin, relatively flexible sealing lips providing an arched recess at the bottom face of said ring, said ring being positioned in said groove and being narrower than the width of said groove for transverse sliding movement therein to provide space between one side of said ring and one side of said groove with said other side of said ring in sealing contact with the other side of said groove and with its upper face contacting said bearing surface, and with the bottom face of said ring adjacent the bottom of said groove normally being spaced above the bottom of said groove, pressurized fluid at one side of said sealing ring within the arched recess of said seal operating radially to expand said ring to move said ring into sealing contact with the other side of said groove to urge said sealing ring away from the bottom of said groove to establish pressurized sealing between its upper face and said bearing surface, said pressurized fluid within the arched recess of said seal operating to flex the sealing lip of said ring adjacent said other side of said groove into intimate contact with said other side of said groove.

2. Sealing means as claimed in claim 1, wherein the upper face of said ring opposite said bottom face has a relatively narrow rounded surface free of sharp edges for contacting said bearing surface and with said wider ring bottom face acting as a differential piston.

3. Sealing means for a pressurized fluid comprising a first element and a second element, one of said elements having an annular groove of rectangular cross section of predetermined width and depth and the other of said elements having a bearing surface extending across said groove, and an annular sealing ring of rubber or like resilient material of generally square cross section having upper and bottom faces positioned in said groove, said ring being narrower than the width of said groove for transverse sliding movement therein to provide space between one side of said ring and one side of said groove with said other side of said ring in sealing contact with the other side of said groove along substantially the entire depth of said ring and with its upper face contacting said bearing surface, the bottom face of said ring adjacent the bottom of said groove having an inwardly arched recessed configuration providing thin relatively flexible sealing lips at each side of said ring for sealing against one side of said groove and with the bottom face of said ring adjacent the bottom of said groove normally being spaced above the bottom of said groove, pressurized fluid at one side of said sealing ring operating to move said ring into sealing contact with the other side of said groove and to pressurize the region within the arched recess of said seal both to flex the sealing lip of said ring adjacent said other side of said groove into intimate contact with said other side and to urge said sealing ring away from the bottom of said groove to establish pressurized sealing between its upper face and said bearing surface.

4. Sealing means for a pressurized fluid comprising two elements including a substantially cylindrical shaft and a housing about said shaft, one of said elements having an annular groove of rectangular cross section of predetermined width and depth and the other of said elements having a bearing surface extending across said groove but having a clearance space between it and said one element at the sides of said groove, and an annular sealing ring of rubber or like resilient material of generally square cross section having upper and bottom faces positioned in said groove, said ring being narrower than the width of said groove for transverse sliding movement therein to provide space between one side of said ring and one side of said groove with said other side of said ring in sealing contact with the other side of said groove along substantially the entire depth of said ring and with its upper face contacting said bearing surface extending outwardly beyond said groove by an amount greater than the clearance space between said bearing surfaces, the bottom face of said ring adjacent the bottom of said groove normally being spaced above the bottom of said groove and having an inwardly arched recessed configuration providing thin relatively flexible sealing lips at each side of said ring for sealing against one side of said groove, pressurized fluid at one side of said sealing ring operating to move said ring into sealing contact with the other side of said groove and to pressurize the region within the arched recess of said seal both to flex the sealing lip of said ring adjacent said other side of said groove into intimate contact with said other side and to urge said sealing ring away from the bottom of said groove to establish pressurized sealing between its upper face and said bearing surface.

5. Sealing means as claimed in claim 4 wherein the upper face of said ring opposite said bottom face has a relatively narrow raised rounded surface free of sharp edges for contacting said other bearing surface for sliding movement therealong and with said wider ring bottom surface acting as a differential piston to apply substantially higher sealing forces than are applied by said pressurized fluid.

6. Sealing means as claimed in claim 4 wherein a pair of adjacent grooves and seals are provided for pressure sealing.

7. Sealing means for a pressurized fluid comprising two elements including a substantially cylindrical shaft and a housing about said shaft having a bearing surface, said shaft having an annular groove of rectangular cross section of predetermined width and depth and said housing bearing surface extending across said groove but having a clearance space therebetween and said shaft at the sides of said groove, and an annular sealing ring of rubber or like resilient material of generally square cross section having upper and bottom faces positioned in said groove, said ring being narrower than the width of said groove for transverse sliding movement therein to provide space between one side of said ring and one side of said groove with said other side of said ring in sealing contact with the other side of said groove along substantially the entire depth of said ring and with its upper face extending beyond said groove and contacting said housing bearing surface said ring having a diameter greater than that of said shaft by an amount greater than the clearance space between said shaft and said housing bearing surface, the bottom face of said ring adjacent the bottom of said groove normally being spaced above the bottom of said groove radially outwardly therefrom and having an inwardly arched recessed configuration providing thin relatively flexible sealing lips at each side of said ring for sealing against one side of said groove, and the upper face of said ring opposite said bottom face having a relatively narrow raised rounded surface free of sharp edges for contacting said housing bearing surface for sliding movement therealong and with said wider ring bottom surface acting as a differential piston to apply substantially higher sealing forces than are applied by said pressurized fluid, pressurized fluid at one side of said sealing ring operating to move said ring into sealing contact with the other side of said groove and to pressurize the region within the arched recess of said seal both to flex the sealing lip of said ring adjacent said other side of said groove into intimate contact with said other side and to urge said sealing ring away from the bottom of said groove to establish a greater degree of pressurized sealing between its upper face rounded surface and said housing bearing surface.

8. In sealing means for a pressurized fluid comprising a first element and a second element, one of said elements having an annular groove of rectangular cross section of predetermined width and depth and the other of said elements having a bearing surface extending across said groove, the combination of an annular sealing ring of rubber or like resilient material of generally square cross section and having upper and bottom faces with said bottom face having a configuration providing at least one thin, relatively flexible sealing lip at one side of said ring, said ring being positioned in said groove and being narrower than the width of said groove for transverse sliding movement therein to provide space between one side of said ring and one side of said groove with said other side of said ring in sealing contact with the other side of said groove and with its upper face contacting said bearing surface and with the bottom face of said ring adjacent the bottom of said groove normally being spaced above the bottom of said groove, pressurized fluid at one side of said sealing ring operating radially to distort said ring to move said ring into sealing contact with the other side of said groove and to urge said sealing ring away from the bottom of said groove to establish pressurized sealing between its upper face and said bearing surface.

9. The combination as claimed in claim 8, wherein the bottom face of said ring adjacent the bottom of said groove has an inwardly arched recessed configuration providing a thin, relatively flexible sealing lip at each side of said ring for sealing against one side of said groove, the region within the arched recess of said seal being pressurized to flex the sealing lip of said ring adjacent said other side of said groove into intimate contact with said other side.

10. The combination as claimed in claim 9, wherein the upper face of said ring opposite said bottom face has a relatively narrow rounded surface free of sharp edges for contacting said bearing surface and with said wider ring bottom face acting as a differential piston.

References Cited in the file of this patent

UNITED STATES PATENTS

| 2,420,929 | Buffington et al. | May 20, 1947 |
| 2,427,439 | Brown | Sept. 16, 1947 |
| 2,841,429 | McCuistion | July 1, 1958 |
| 2,873,132 | Tanner | Feb. 10, 1959 |

FOREIGN PATENTS

| 614,140 | Germany | June 3, 1935 |
| 899,438 | Germany | July 5, 1954 |
| 1,118,313 | France | Mar. 12, 1956 |
| 460,407 | Great Britain | Jan. 27, 1937 |
| 736,271 | France | Sept. 13, 1932 |